US011881650B2

(12) United States Patent
Sundarakrishnamachari et al.

(10) Patent No.: US 11,881,650 B2
(45) Date of Patent: Jan. 23, 2024

(54) ELECTRICAL CONNECTOR ASSEMBLY WITH MALE TERMINAL STABILIZER

(71) Applicant: Aptiv Technologies AG, Schaffhausen (CH)

(72) Inventors: Rangarajan Sundarakrishnamachari, Chennai (IN); Dineshkumar Manoharan, Chennai (IN); Matthew Penn, Cortland, OH (US)

(73) Assignee: Aptiv Technologies AG, Schaffhausen (CH)

( * ) Notice: Subject to any disclaimer, the term of this patent is extended or adjusted under 35 U.S.C. 154(b) by 18 days.

(21) Appl. No.: 17/549,087

(22) Filed: Dec. 13, 2021

(65) Prior Publication Data

US 2022/0200189 A1 Jun. 23, 2022

Related U.S. Application Data

(60) Provisional application No. 63/128,648, filed on Dec. 21, 2020.

(51) Int. Cl.
*H01R 13/506* (2006.01)
*H01R 13/424* (2006.01)

(52) U.S. Cl.
CPC ......... *H01R 13/506* (2013.01); *H01R 13/424* (2013.01)

(58) Field of Classification Search
CPC .............. H01R 13/424; H01R 13/4365; H01R 13/4538; H01R 13/506; H01R 13/629
See application file for complete search history.

(56) References Cited

U.S. PATENT DOCUMENTS

| | | | | |
|---|---|---|---|---|
| 9,520,669 | B2 * | 12/2016 | Gerwatowski | H01R 13/4538 |
| 9,837,749 | B2 * | 12/2017 | Furuya | H01R 13/4538 |
| 11,502,444 | B2 * | 11/2022 | Sundarakrishnamachari | H01R 13/4368 |
| 11,594,835 | B2 * | 2/2023 | Probert | H01R 13/4365 |
| 2017/0117660 | A1 | 4/2017 | Furuya et al. | |

(Continued)

FOREIGN PATENT DOCUMENTS

| | | |
|---|---|---|
| JP | 2011086478 A | 4/2011 |
| WO | 2018208499 A1 | 11/2018 |

OTHER PUBLICATIONS

"Extended European Search Report Received dated May 12, 2022", 26 pages.

*Primary Examiner* — Oscar C Jimenez
(74) *Attorney, Agent, or Firm* — Billion & Armitage

(57) ABSTRACT

An electrical connector assembly includes a first connector body, a male terminal stabilizer disposed within the first connector body that is movable from a pre-staged position to a full staged position, a second connector body, means for retaining the male terminal stabilizer in the pre-staged position until the second connector body is inserted within the first connector body, means for releasing the male terminal stabilizer from the pre-stage position and allow the second connector body to push the male terminal stabilizer to the full staged position, means for returning the male terminal stabilizer from the full staged position to the pre-staged when the second connector body is withdrawn from the first connector body, and means for retaining the male terminal stabilizer in the first connector body as the second connector body is withdrawn from the first connector body.

20 Claims, 16 Drawing Sheets

(56) References Cited

U.S. PATENT DOCUMENTS

| | | | |
|---|---|---|---|
| 2019/0379148 | A1 | 12/2019 | Sundarakrishnamachari et al. |
| 2021/0184398 | A1 | 6/2021 | Narro et al. |

* cited by examiner

ELECTRICAL CONNECTOR ASSEMBLY WITH MALE TERMINAL STABILIZER

CROSS-REFERENCE TO RELATED APPLICATION

This application claims benefit of priority to U.S. Application No. 63/128,648 filed on Dec. 21, 2020, the entire disclosure of which is hereby incorporated by reference.

BACKGROUND

A conventional unsealed electrical connector often uses a male terminal stabilizer to protect the male terminals from damage caused by bending prior to mating with corresponding female terminals of a mating electrical connector. The male terminal stabilizer is movable from a pre-staged position in which the male terminal stabilizer is positioned near the tips of the male terminals to a full staged position near the base of the male terminals to allow the male terminal to be fully seated within the mating female terminals. The prior male terminal stabilizer designs have pre-stage locks that are designed in such a way that they provide only a low blocking force in the range of 30 to 40 newtons so that the mating female connector can push the male terminal stabilizer from the initial pre-staged position to the final full staged position when the male connector is mated with the female connector during the process of assembling the electrical connector assembly. These male terminal stabilizer pre-stage locks may be prematurely released from the pre-staged position by an unknown object overcoming the blocking force during shipping and handling prior to the electrical connector mating with the corresponding mating electrical connector. Other male terminal stabilizer designs may require complex features and geometric shapes to provide a greater blocking force that undesirably increase tooling costs for manufacturing the electrical connector.

SUMMARY

According to one or more aspects of the present disclosure, an electrical connector assembly includes a first connector body including a flexible pre-stage locking arm defining a pre-stage stop face and a pair of angled rib features flanking the pre-stage stop face and a male terminal stabilizer disposed within the first connector body that is movable from a pre-staged position to a full staged position and defines a pre-stage stop tab and a flexible retention arm having a hook feature on its distal end. The pre-stage stop face of the pre-stage locking arm is configured to engage the pre-stage stop tab to inhibit movement of the male terminal stabilizer from the pre-staged position to the full staged position and wherein the hook feature of the flexible retention arm is configured to engage a retention stop face defined by the first electrical connector body. The electrical connector assembly also includes a second connector body configured to contact the pair of angled rib features and disengage the pre-stage stop face from the pre-stage stop tab when the first connector body is mated with the second connector body, thereby allowing the second connector body to push the male terminal stabilizer from the pre-staged position to the full staged position. The male terminal stabilizer defines a flexible retraction arm having a hook feature on its distal end that engages a retraction face defined by the second electrical connector body when the first connector body is unmated from the second connector body, thereby pulling the male terminal stabilizer from the full staged position to the pre-staged position.

In one or more embodiments of the electrical connector assembly according to the previous paragraph, the retraction arm and the retraction face exerts a retraction force on the male terminal stabilizer and the retention arm and retention stop face exerts a retention force on the male terminal stabilizer as the first connector body is unmated from the second connector body. The retraction arm disengages from the retraction face when the retention force exceeds the retraction force.

In one or more embodiments of the electrical connector assembly according to any one of the previous paragraphs, the retraction arm and the retraction face are engaged prior to disengagement of the pre-stage stop face from the pre-stage stop tab when the first connector body is mated with the second connector body.

In one or more embodiments of the electrical connector assembly according to any one of the previous paragraphs, the electrical connector assembly further includes a plurality of male terminals disposed in a first plurality of terminal cavities defined in the first connector body. The plurality of male terminals is disposed in a plurality of apertures in the male terminal stabilizer. The male terminal stabilizer is positioned near distal tips of the plurality of male terminals when in the pre-staged position and is positioned near bases of the plurality of male terminals when in the full staged position.

In one or more embodiments of the electrical connector assembly according to any one of the previous paragraphs, the electrical connector assembly further includes a plurality of female socket terminals disposed in a second plurality of terminal cavities defined in the second connector body. The plurality of male terminals are received in the plurality of female socket terminals when the first connector body is mated with the second connector body.

In one or more embodiments of the electrical connector assembly according to any one of the previous paragraphs, the pre-stage stop face is arranged substantially perpendicular to the pre-stage locking arm and wherein the pre-stage stop face is arranged substantially parallel to the pre-stage stop tab when the male terminal stabilizer is in the pre-staged position.

In one or more embodiments of the electrical connector assembly according to any one of the previous paragraphs, the hook feature of the flexible retention arm is arranged substantially perpendicular to the pre-stage locking arm retention stop face when the male terminal stabilizer is in the pre-staged position or in the full staged position.

In one or more embodiments of the electrical connector assembly according to any one of the previous paragraphs, the retraction face defined by the second electrical connector body is arranged at an acute angle to the hook feature of the flexible retraction arm.

In one or more embodiments of the electrical connector assembly according to any one of the previous paragraphs, the pair of angled rib features are aligned longitudinally and wherein the second connector body defines a pair of laterally aligned rib features configured to contact the pair of angled rib features and disengage the pre-stage stop face from the pre-stage stop tab.

According to one or more aspects of the present disclosure, method of connecting and disconnecting an electrical connector assembly having a first connector including a first connector body including a flexible pre-stage locking arm defining a pre-stage stop face and a pair of angled rib features flanking the pre-stage stop face and a male terminal stabilizer disposed within the first connector body that is movable from a pre-staged position to a full staged position and defines a pre-stage stop tab and a flexible retention arm having a hook feature on its distal end. The electrical connector further including a second connector body includes the steps of a) engaging the pre-stage stop face of the pre-stage locking arm with the pre-stage stop tab to inhibit movement of the male terminal stabilizer from the pre-staged position to the full staged position and b) engaging the hook feature of the flexible retention arm with a retention stop face defined by the first electrical connector body to secure the male terminal stabilizer within the first connector body.

In one or more embodiments of the method according to the previous paragraph, the method further includes the step c) of inserting the male terminal stabilizer within a shroud of the first connector body, wherein step c) occurs prior to steps a) and b).

In one or more embodiments of the method according to any one of the previous paragraphs, the method further includes the steps of d) inserting the second connector body within a shroud of the first connector body, e) contacting the pair of angled rib features with the second connector body, f) bending the pre-stage locking arm outwardly from the first connector body, g) disengaging the pre-stage stop face from the pre-stage stop tab when the first connector body is mated with the second connector body, and h) pushing the male terminal stabilizer from the pre-staged position to the full staged position.

In one or more embodiments of the method according to any one of the previous paragraphs, the male terminal stabilizer defines a flexible retraction arm having a hook feature on its distal end. The method further includes the steps of i) removing the second connector body from the shroud of the first connector body, j) engaging the hook feature of the retraction arm with a retraction face defined by the second electrical connector body when the first connector body is unmated from the second connector body, and k) pulling the male terminal stabilizer from the full staged position to the pre-staged position via the engagement of the hook feature of the retraction arm with the retraction face.

In one or more embodiments of the method according to any one of the previous paragraphs, step j) occurs prior to step g). This occurs during the during the mating of the connectors. The hook feature engages with retraction feature twice, once during mating and once during unmating of the connectors.

In one or more embodiments of the method according to any one of the previous paragraphs, the method further includes step l), reengaging the pre-stage stop face of the pre-stage locking arm with the pre-stage stop tab to inhibit movement of the male terminal stabilizer from the pre-staged position to the full staged position.

In one or more embodiments of the method according to any one of the previous paragraphs, the method further includes step m), disengaging the hook feature of the retraction arm from the retraction face when the hook feature of the flexible retention arm engages the retention stop face.

In one or more embodiments of the method according to any one of the previous paragraphs, the retraction arm and the retraction face exerts a retraction force on the male terminal stabilizer and the retention arm and retention stop face exerts a retention force on the male terminal stabilizer as the first connector body is unmated from the second connector body. The retraction arm disengages from the retraction face when the retention force exceeds the retraction force.

In one or more embodiments of the method according to any one of the previous paragraphs, the method further includes the steps n) inserting a plurality of male terminals in a first plurality of terminal cavities defined in the first connector body and o) placing the plurality of male terminals in a plurality of apertures defined by in the male terminal stabilizer, wherein the male terminal stabilizer is positioned near distal tips of the plurality of male terminals when in the pre-staged position and is positioned near bases of the plurality of male terminals when in the full staged position, wherein step o) occurs prior to step d).

In one or more embodiments of the method according to any one of the previous paragraphs, the method further includes the steps p) inserting a plurality of female socket terminals disposed in a second plurality of terminal cavities defined in the second connector body, wherein step p) occurs prior to step d) and o) receiving the plurality of male terminals in the plurality of female socket terminals during step d).

According to one or more aspects of the present disclosure, an electrical connector assembly includes a first connector body, a male terminal stabilizer disposed within the first connector body that is movable from a pre-staged position to a full staged position, a second connector body, means for retaining the male terminal stabilizer in the pre-staged position until the second connector body is inserted within the first connector body, means for releasing the male terminal stabilizer from the pre-stage position and allow the second connector body to push the male terminal stabilizer to the full staged position, means for returning the male terminal stabilizer from the full staged position to the pre-staged when the second connector body is withdrawn from the first connector body, and means for retaining the male terminal stabilizer in the first connector body as the second connector body is withdrawn from the first connector body.

DETAILED DESCRIPTION

A non-limiting example of an electrical connector assembly 100 is illustrated in FIGS. 1-22C and is described herein. The electrical connector assembly 100 includes a terminal stabilizer that is configured to hold male electrical terminals is proper spacing and alignment as the connectors of the electrical connector assembly 100 are mated. Such a terminal stabilizer is often referred to as a male terminal stabilizer 102 since it is typically male blade or pin terminals that require stabilization due to their elongated blades or pins.

Figure 5:
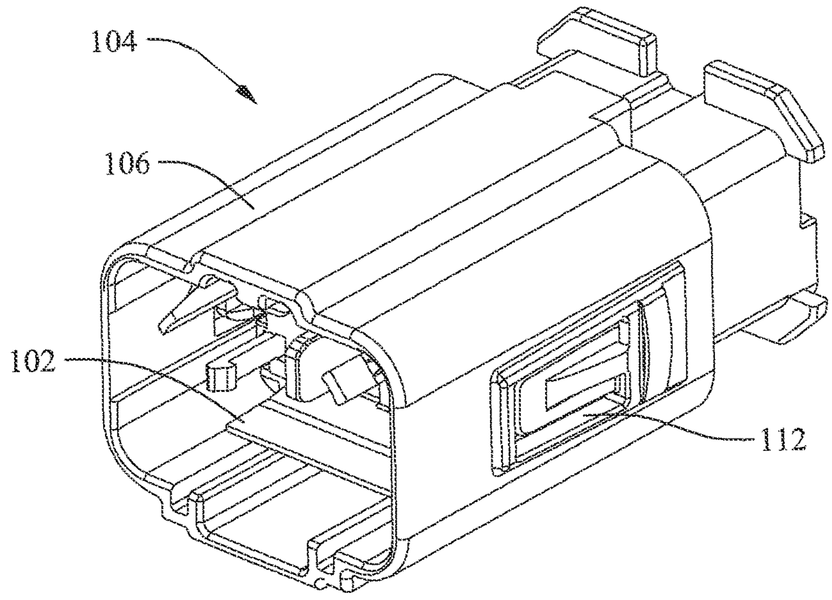
FIG. 5 is a perspective view of a male connector of the electrical connector assembly of FIG. 1 according to some embodiments.
Figure 6:
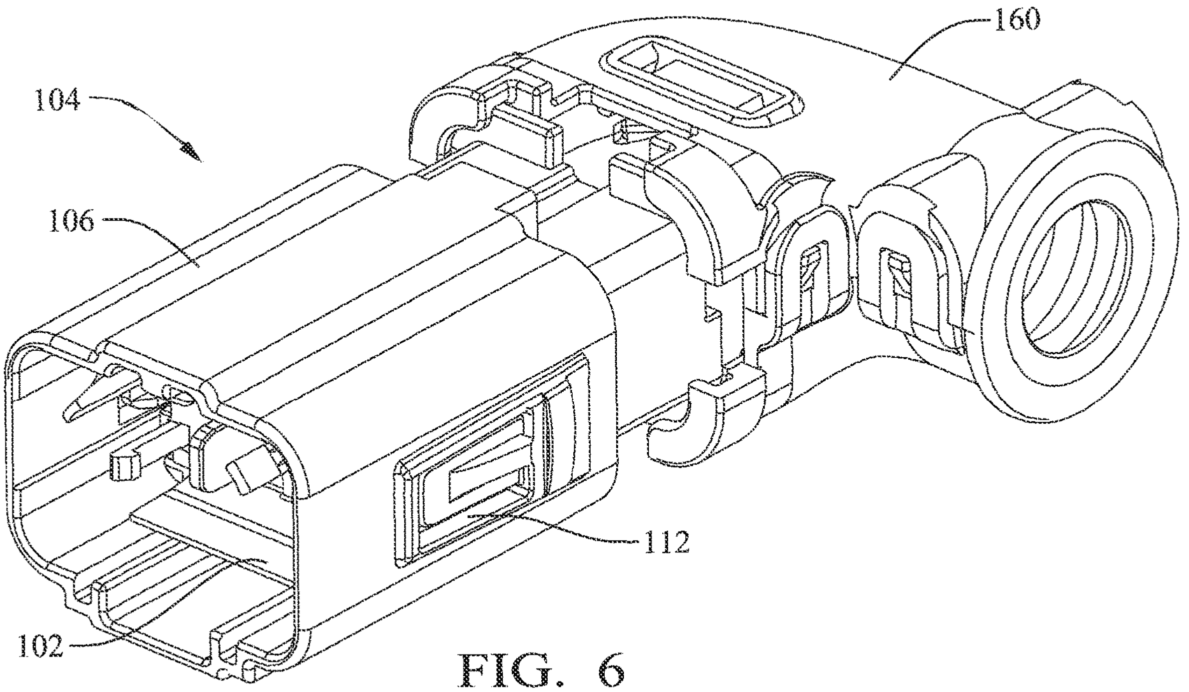
FIG. 6 is a perspective view of the male connector of FIG. 5 including a wire dress cover according to some embodiments.
Figure 7:
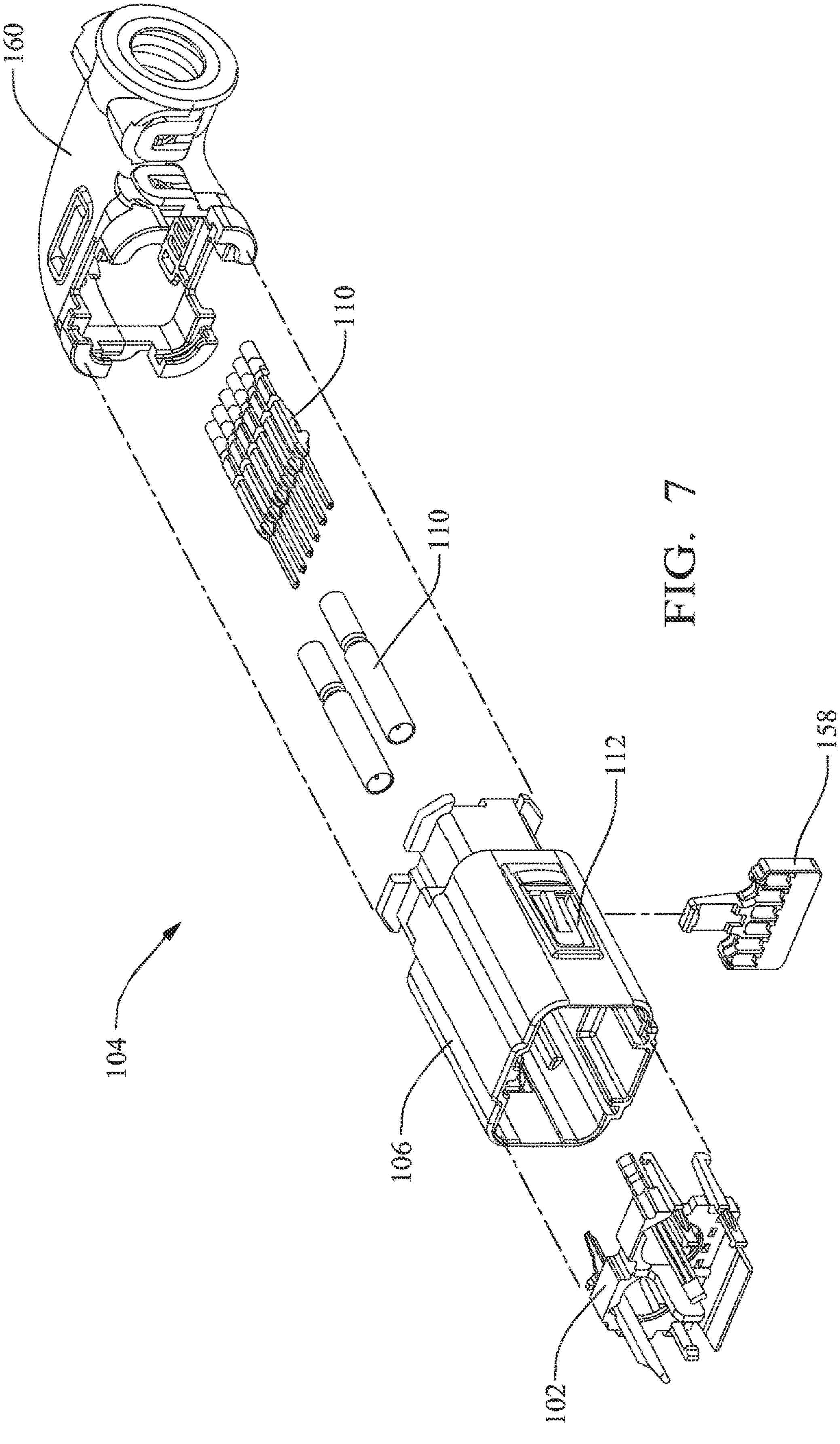
FIG. 7 is an exploded perspective view of the male connector of FIG. 6 according to some embodiments.
Figure 12A:
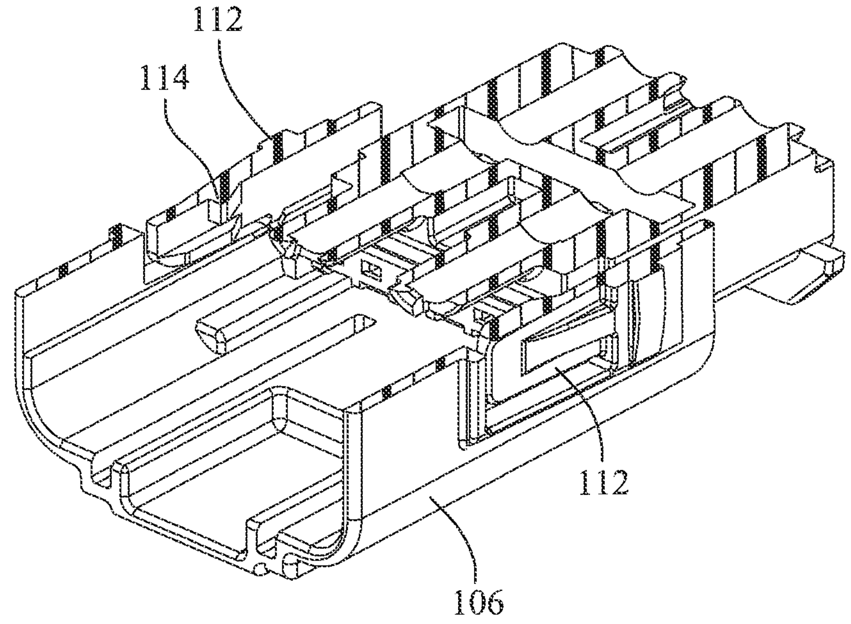
FIG. 12A is a cut-away perspective view of a pair of male terminal stabilizer pre-stage flexible locks in a male connector body of the male connector of FIG. 5 according to some embodiments.
Figure 12B:
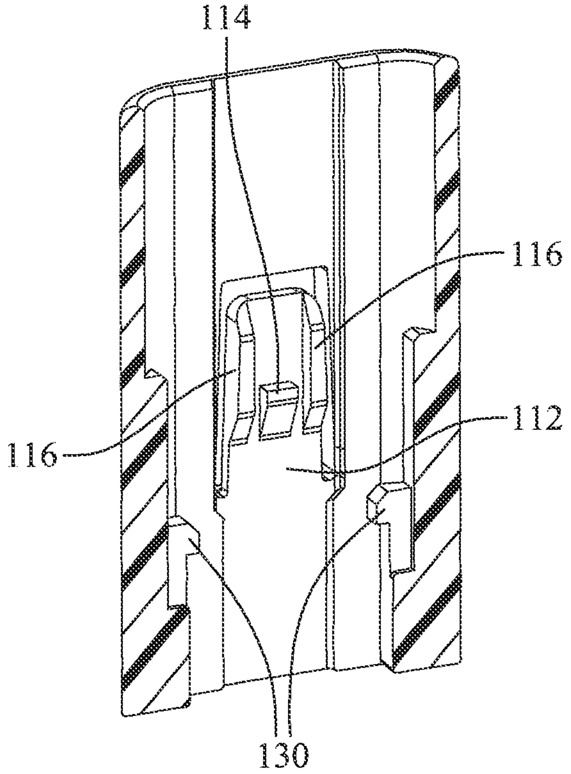
FIG. 12B is a cut-away perspective view of a male terminal stabilizer positive stop face and male terminal stabilizer pre-stage retention locks in the male connector body of the male connector of FIG. 5 according to some embodiments.
Figure 15:
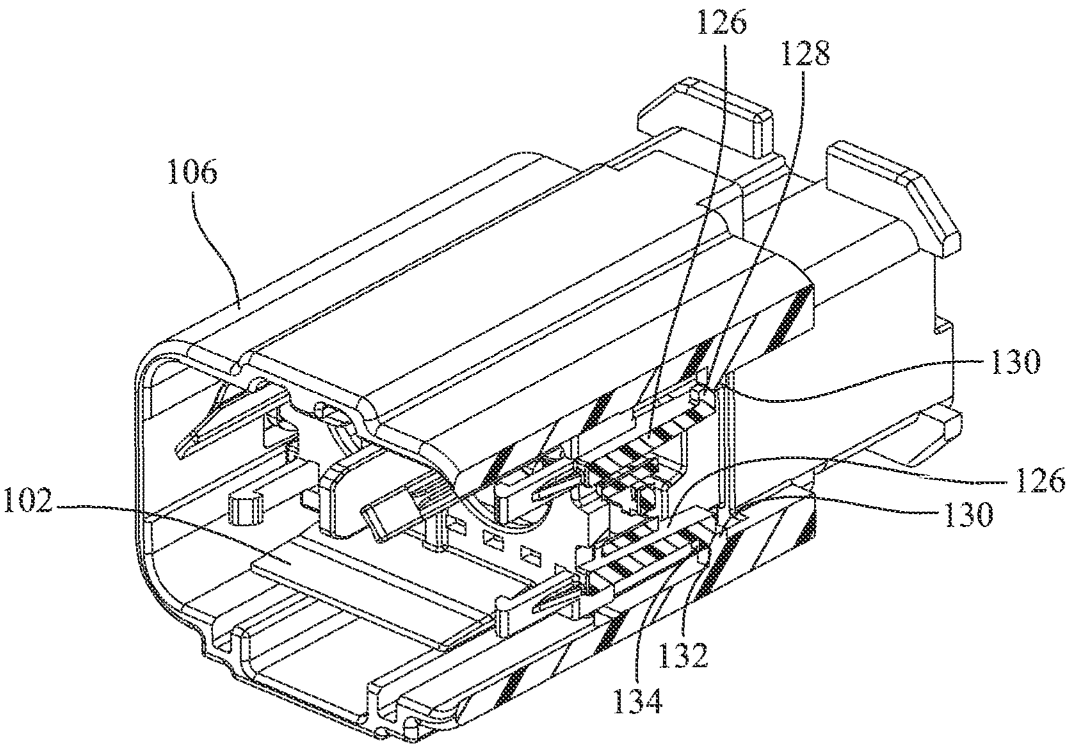
FIG. 15 is a cut-away perspective view of male connector of FIG. 5 illustrating the male terminal stabilizer pre-stage retention locks pre-engaged with the male solid locks according to some embodiments.
Figure 16:
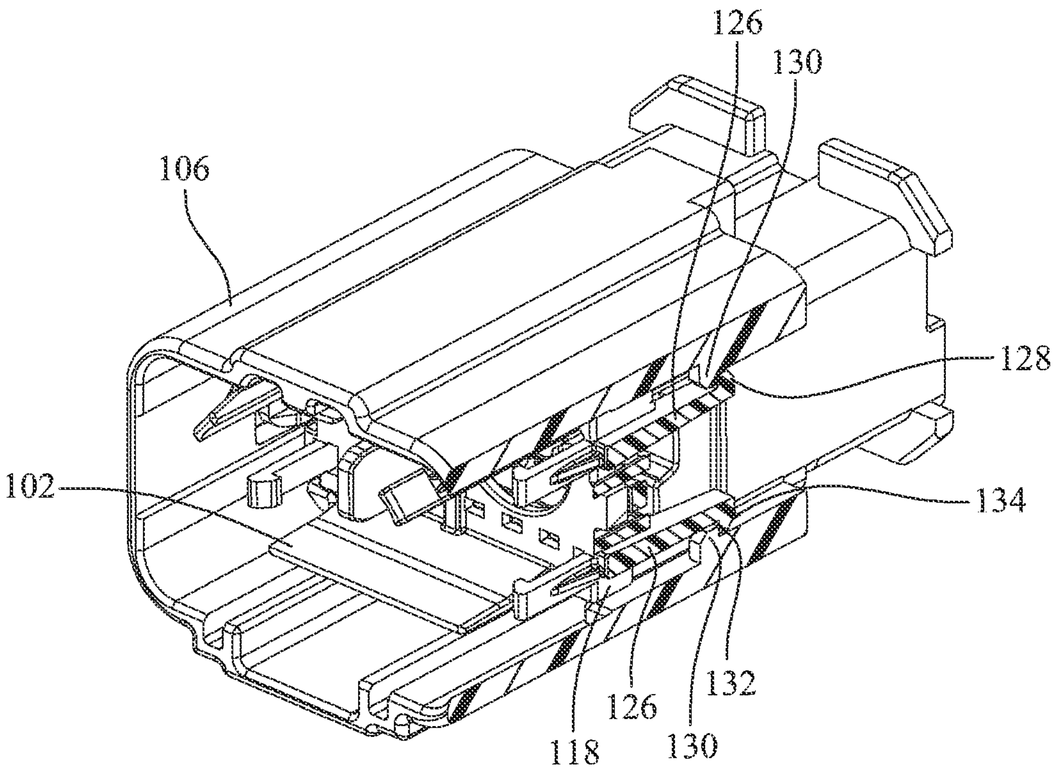
FIG. 16 is a cut-away perspective view of male connector of FIG. 5 illustrating the male terminal stabilizer pre-stage retention locks in fully engaged condition with the male solid locks according to some embodiments.
Figure 17A:
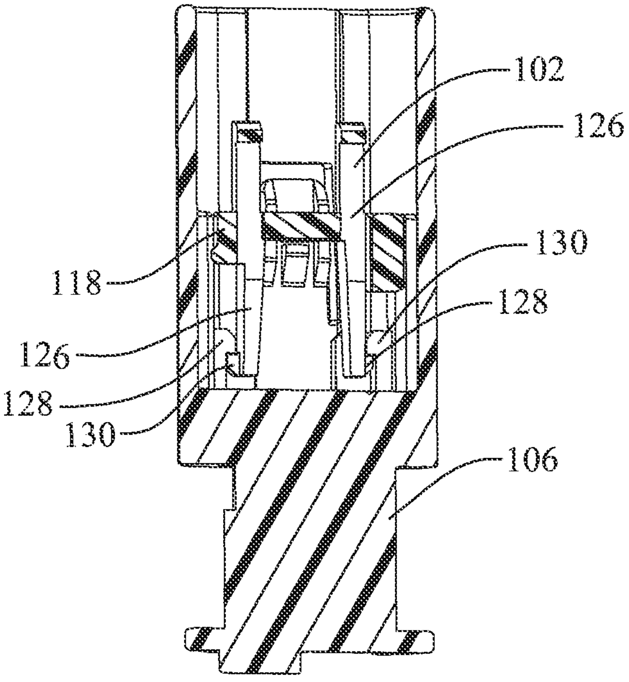
FIGS. 17A and 17B are cut-away perspective views of male connector of FIG. 5 illustrating the male terminal stabilizer firmly positioned in pre-stage position (on a positive lock arrangement) according to some embodiments.
Figure 17B:
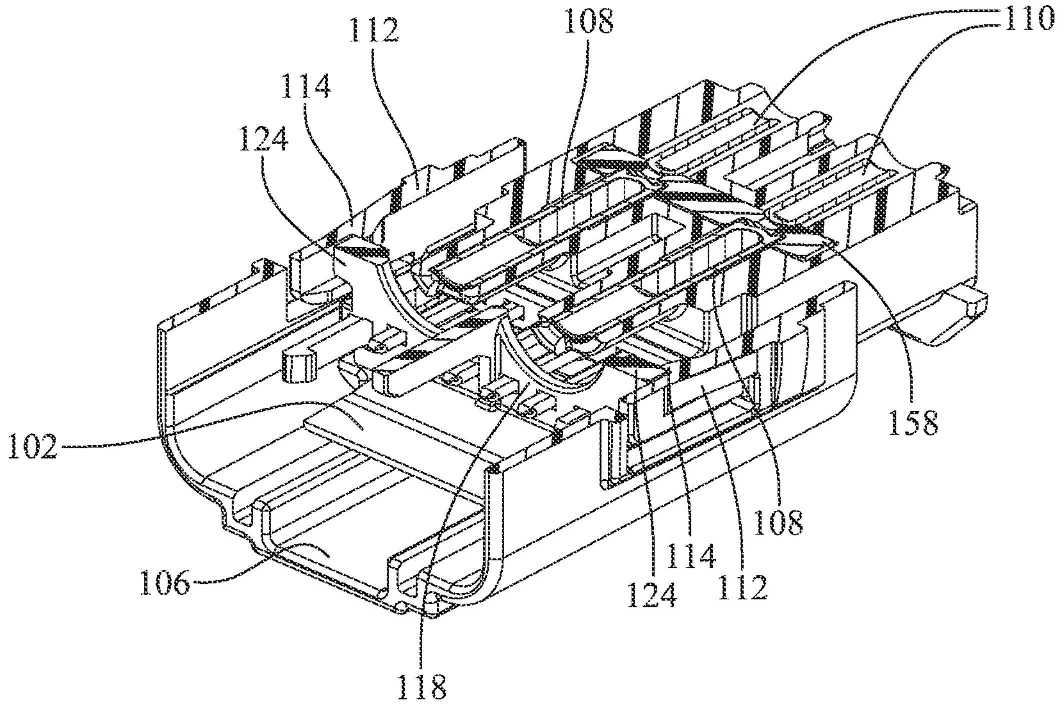
Figure 18A:
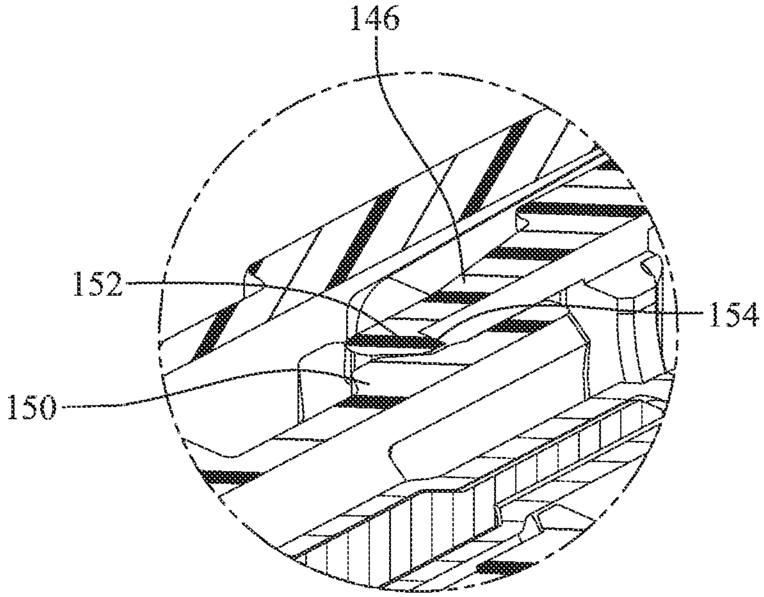
FIGS. 18A and 18B are cut-away perspective views of the connector assembly of FIG. 1 illustrating the solid retraction locks of the female connector engaging with the male terminal stabilizer retraction locks according to some embodiments.
Figure 18B:
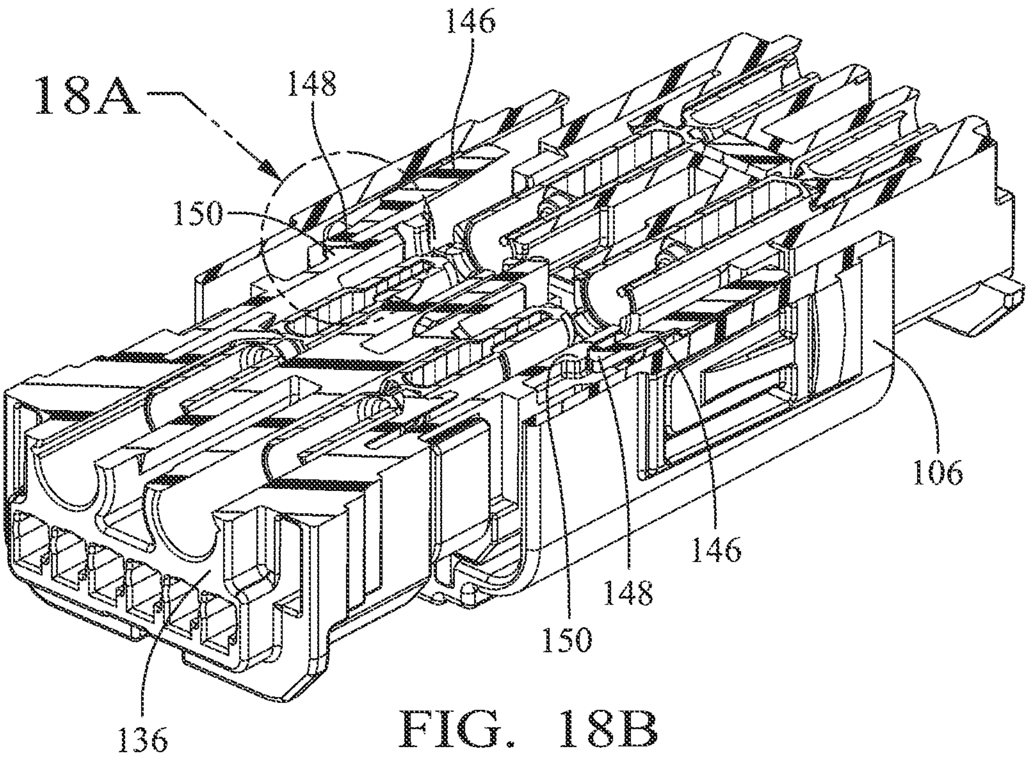

A first connector of the electrical connector assembly 100 illustrated in FIG. 5, hereinafter referred to as the male connector 104, has a first connector body 106 that defines a first plurality of terminal cavities 108 in which a plurality of male blade or pin terminals 110 are disposed as shown in FIG. 7. The first connector body 106 also includes a pair of flexible pre-stage locking arms 112. Each pre-stage locking arm 112 has a pre-stage stop face 114 and a pair of angled rib features 116 flanking the pre-stage stop face 114 as illustrated in FIGS. 12A and 12B. The male connector 104 also includes a male terminal stabilizer 102 shown in FIG. 7 that is disposed within the first connector body 106 and is movable from a pre-staged position 118 shown in FIG. 16 to a full staged position 120 shown in FIG. 22A-22C. The male terminals 110 are received within apertures 122 defined in the male terminal stabilizer 102 and, in the pre-staged position 118, the male terminal stabilizer 102 is positioned near the distal tips of the male terminals 110 and in the full staged position 120 the male terminal stabilizer 102 is positioned near the base of the male terminals 110. The male terminal stabilizer 102 defines a pair of solid pre-stage stop tabs 124 on opposite sides of the male terminal stabilizer 102 as shown in FIGS. 8-11. The pre-stage stop faces 114 of the pre-stage locking arms 112 are configured to engage the pre-stage stop tabs 124 to inhibit movement of the male terminal stabilizer 102 from the pre-staged position 118 to the full staged position 120 as illustrated in FIGS. 17A and 17B. The male terminal stabilizer 102 also includes a four flexible retention arms 126 that are configured to retain the male terminal stabilizer 102 within the first connector body 106. Each of the four flexible retention arms 126 have a hook feature 128 on its distal end. The hook features 128 of the flexible retention arms 126 are configured to engage solid corresponding retention stop faces 130 defined by the first connector body 106 as shown in FIG. 12B. The hook features 128 have angled faces 132 that cause the retention arms 126 to flex inwardly as they contact the portion of the first connector body 106 defining the retention stop faces 130 as shown in FIG. 15. After the angled faces 132 clear the retention stop faces 130, the retention arms 126 flex outwardly and flat faces 134 of the hook features 128 engage the retention stop faces 130 as shown in FIG. 16. The flat faces 134 are generally parallel to the retention stop faces 130.

Figure 1:
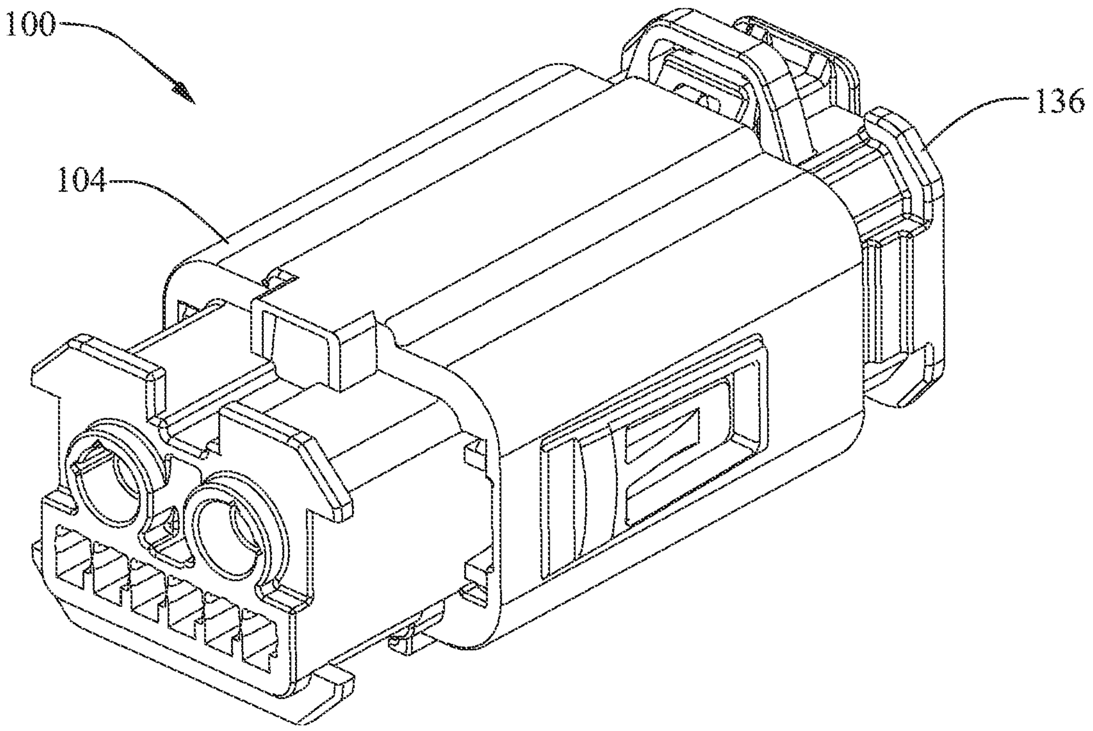
FIG. 1 is a perspective view of an electrical connector assembly according to some embodiments.
Figure 2:
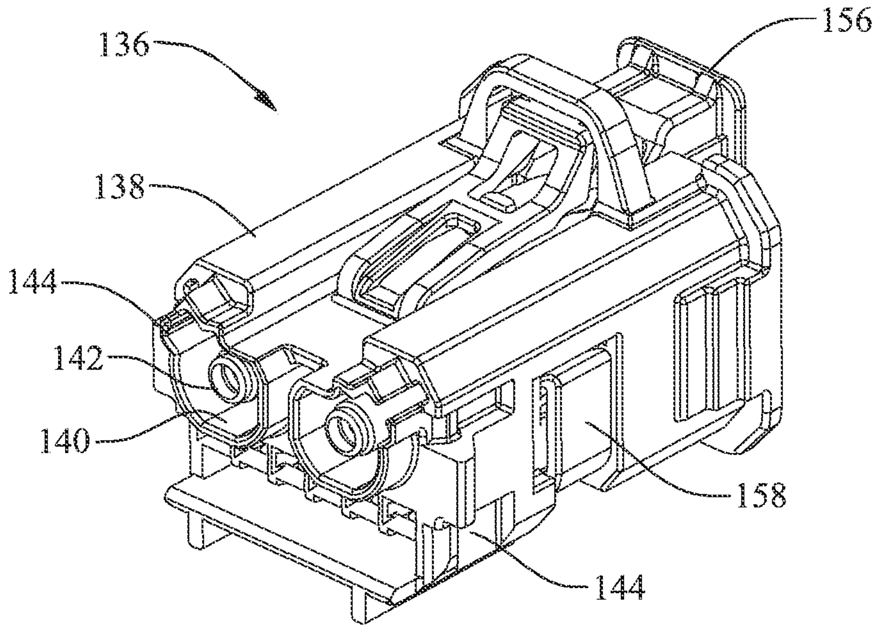
FIG. 2 is a perspective view of a female connector of the electrical connector assembly of FIG. 1 according to some embodiments.
Figures 3, 4:
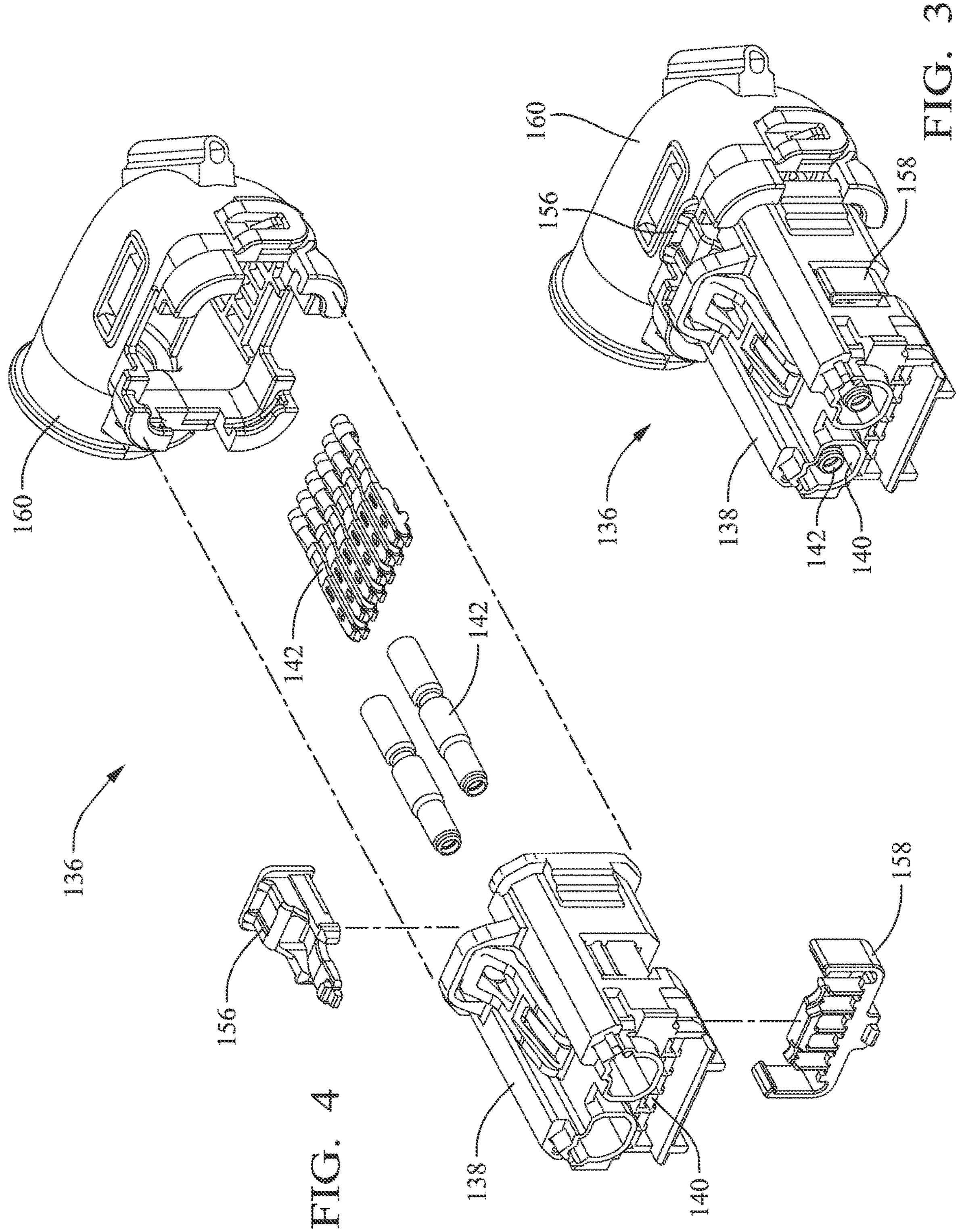
FIG. 3 is a perspective view of the female connector of FIG. 2 including a wire dress cover according to some embodiments.
FIG. 4 is an exploded perspective view of the female connector of FIG. 3 according to some embodiments.
Figure 13:
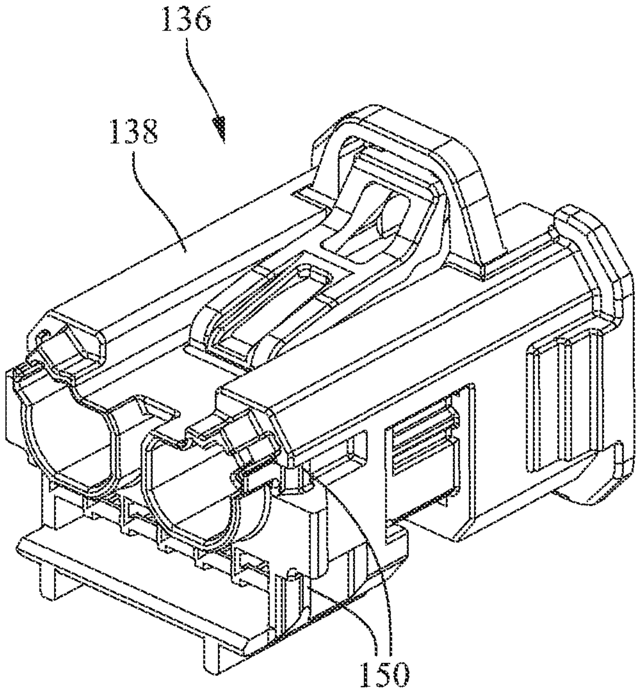
FIG. 13 is a perspective view of male terminal stabilizer retraction solid locks in a female connector body of the female connector of FIG. 2 according to some embodiments.
Figure 14:
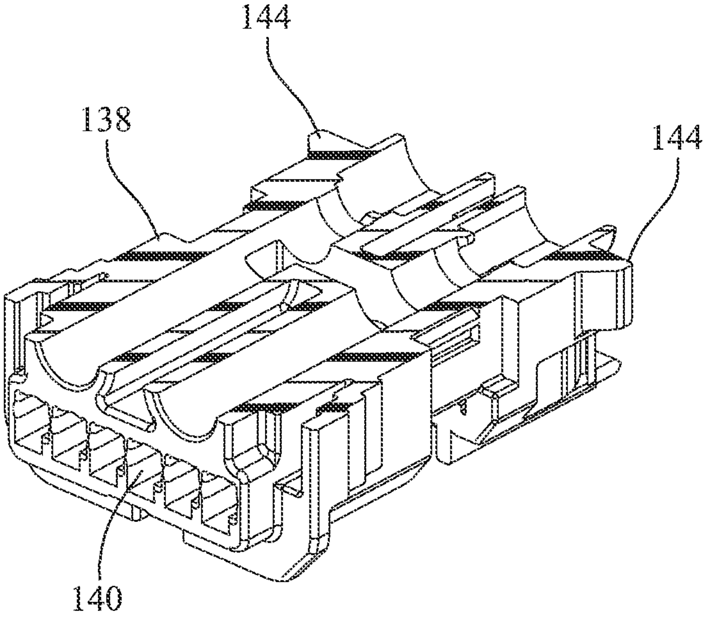
FIG. 14 is a cut-away perspective view of female connector body of the female connector of FIG. 2 illustrating cam release rib features according to some embodiments.

A second connector, hereinafter referred to as the female connector 136 illustrated in FIG. 2, has a second connector body 138 illustrated in FIGS. 13 and 14 that defines a second plurality of terminal cavities 140 in which a plurality of female socket terminals 142 are disposed as shown in FIG. 4. These female socket terminals 142 are configured to receive the male terminals 110. A pair of laterally aligned rib features 144 on the leading edge of the second connector body 138 are configured to contact the pair of angled rib features 116 and bend them outwardly to disengage the pre-stage stop faces 114 of the pre-stage locking arms 112 from the pre-stage stop tab 124 on the male terminal stabilizer 102 when the first connector body 106 is mated with the second connector body 138 as shown in FIGS. 20A-21C. This disengagement allows the second connector body 138 to push the male terminal stabilizer 102 from the pre-staged position 118 to the full staged position 120 shown in FIG. 22A-22C.

Figure 8:
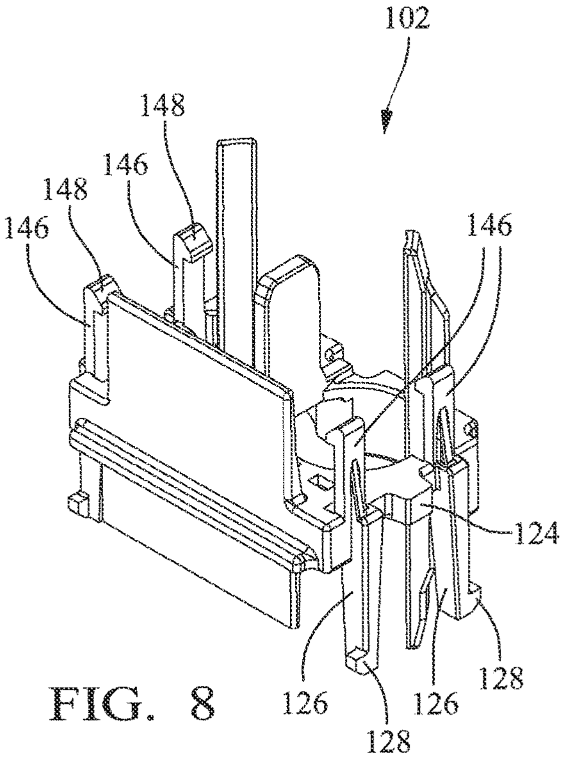
FIG. 8 is a top front perspective view of a male terminal stabilizer of the male connector of FIG. 5 illustrating retraction locks and pre-stage positive locks according to some embodiments.
Figure 9:
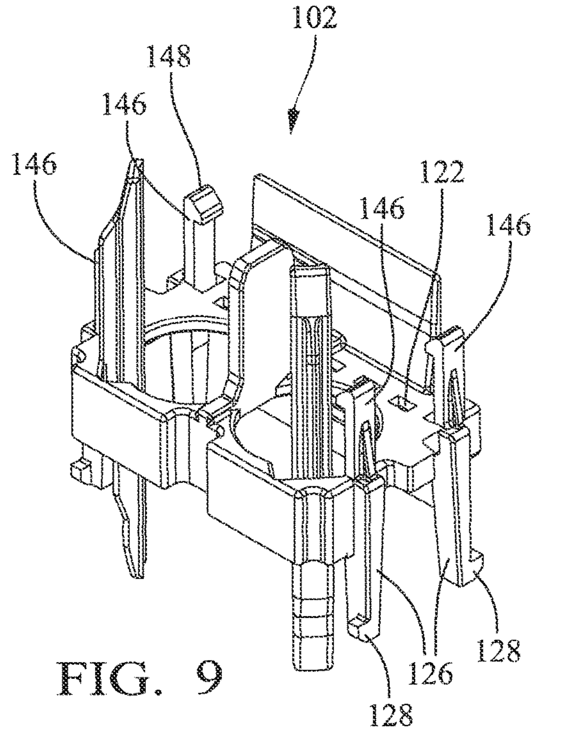
FIG. 9 is a top rear perspective view of the male terminal stabilizer of FIG. 8 illustrating pre-stage retention locks according to some embodiments.
Figure 10:
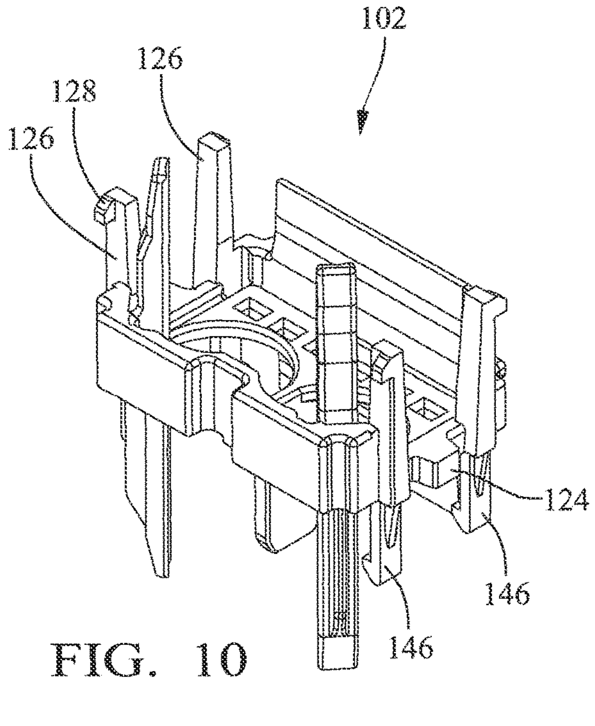
FIG. 10 is a bottom rear perspective view of the male terminal stabilizer of FIG. 8 illustrating retention locks and pre-stage positive locks according to some embodiments.
Figure 11:
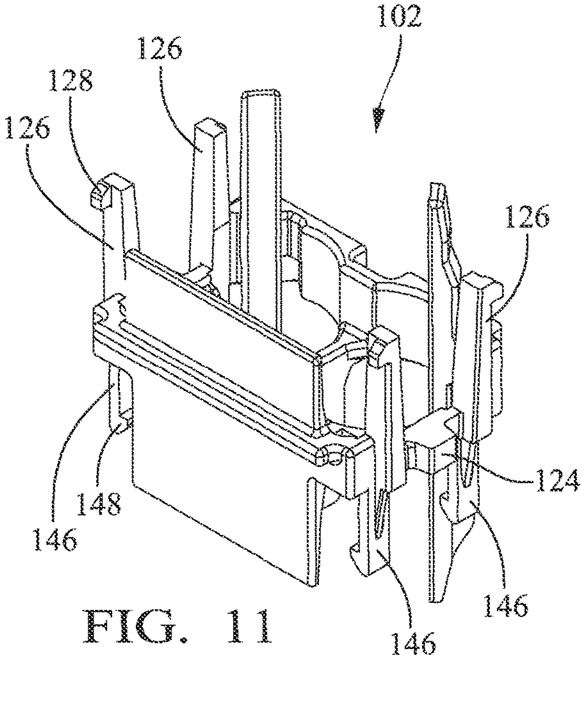
FIG. 11 is a bottom front perspective view of the male terminal stabilizer of FIG. 8 illustrating the pre-stage positive locks and the pre-stage retraction locks according to some embodiments.
Figure 19A:
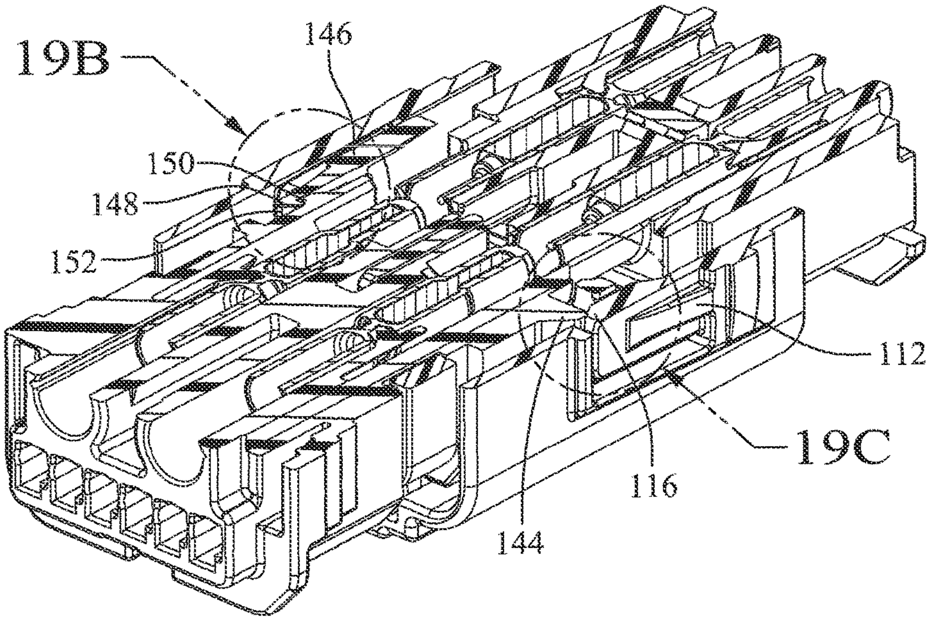
FIGS. 19A to 19C are cut-away perspective views of the connector assembly of FIG. 1 illustrating the solid retraction locks of the female connector engaging with the male terminal stabilizer retraction locks and the cam release ribs of the female connector moving over the cam ramps of the male connector according to some embodiments.
Figure 19B:
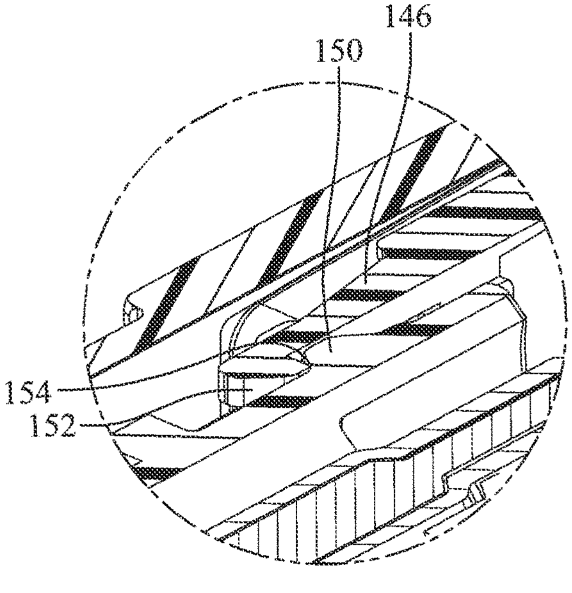
Figure 19C:
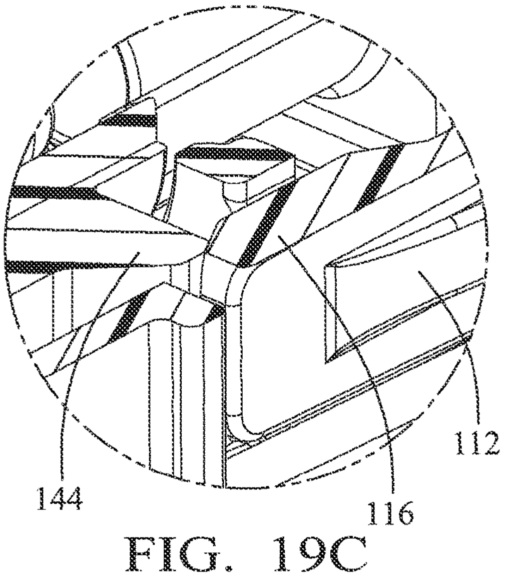
Figure 20A:
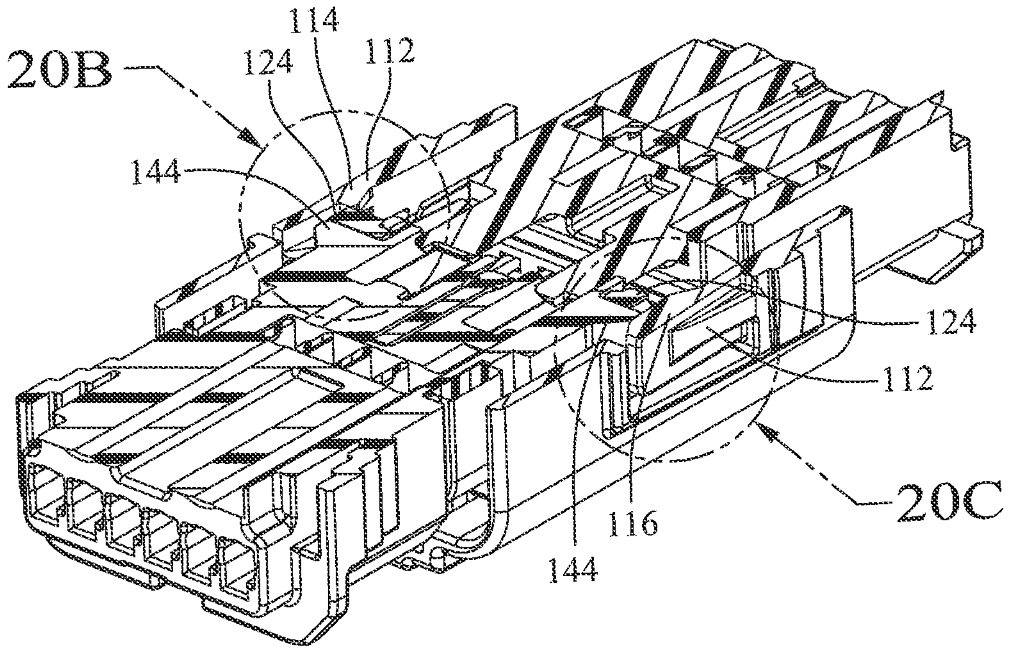
FIGS. 20A to 20C are cut-away perspective views of the connector assembly of FIG. 1 illustrating the female connector engaging the flex locks of the male connector according to some embodiments.
Figure 20B:
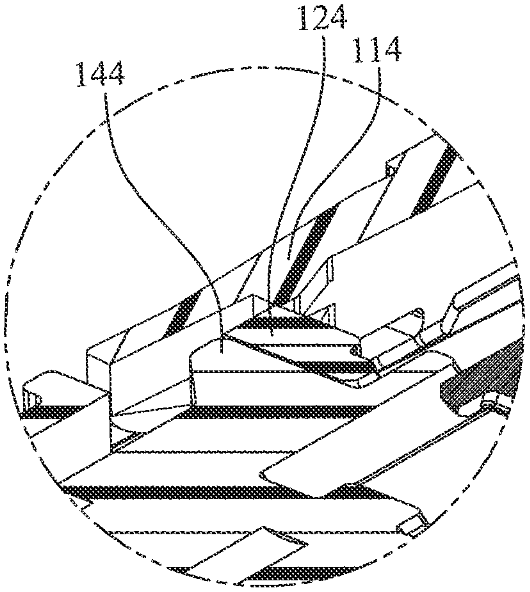
Figure 20C:
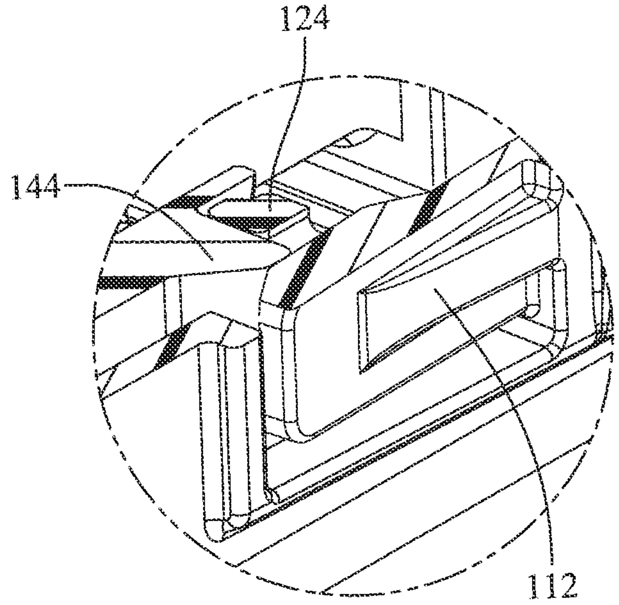
Figure 21A:
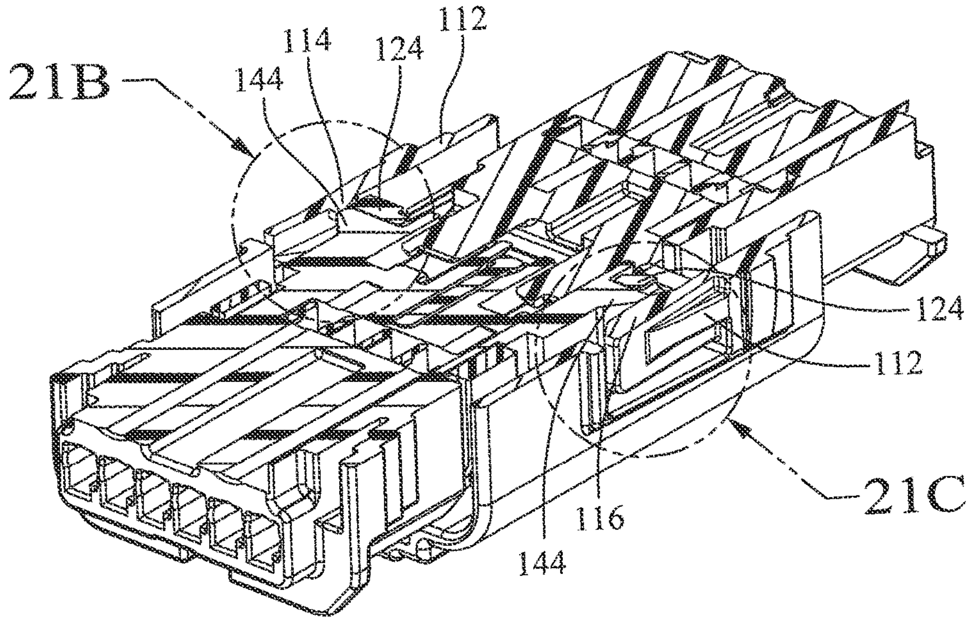
FIGS. 21A to 21C are cut-away perspective views of the connector assembly of FIG. 1 illustrating the female connector moving past the flex locks of the male connector and the male terminal stabilizer being pushed to the full staged position by the female connector according to some embodiments.
Figure 21B:
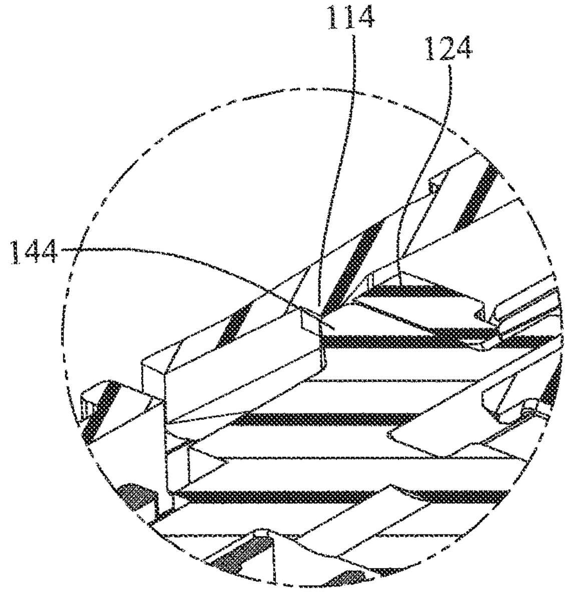
Figure 21C:
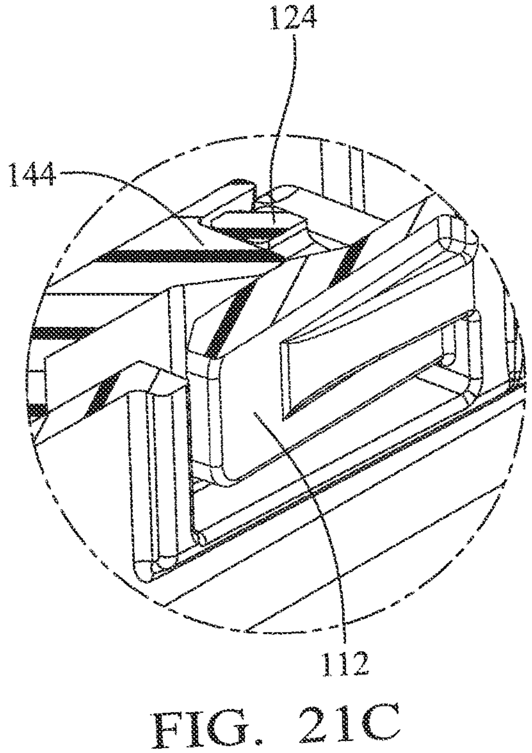
Figure 22A:
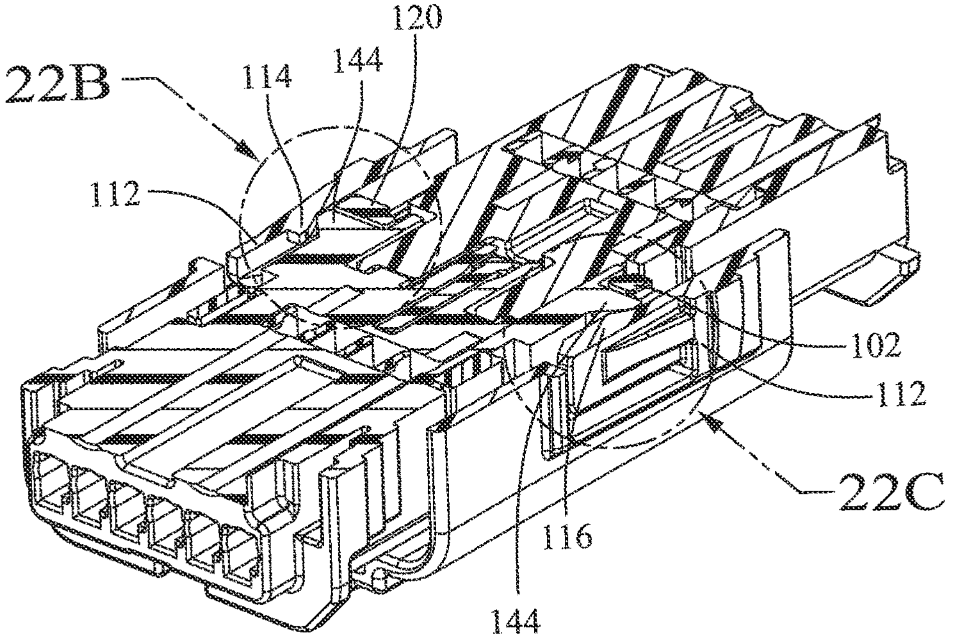
FIGS. 22A to 22C are cut-away perspective views of the connector assembly of FIG. 1 illustrating the male terminal stabilizer in the full staged position according to some embodiments.
Figure 22B:
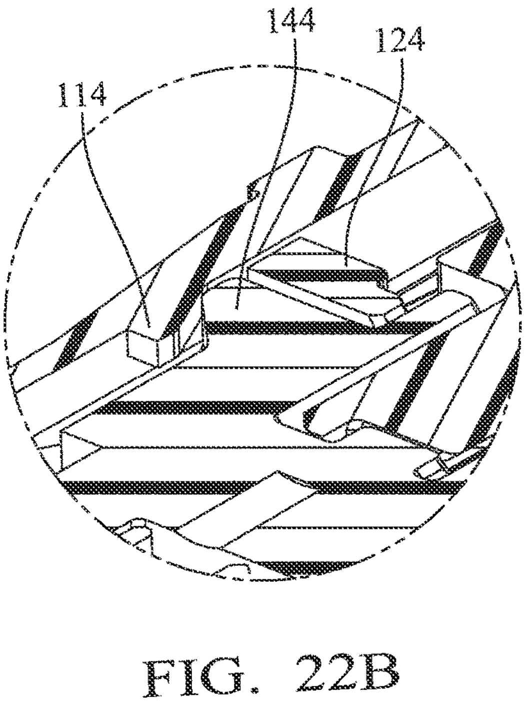
Figure 22C:
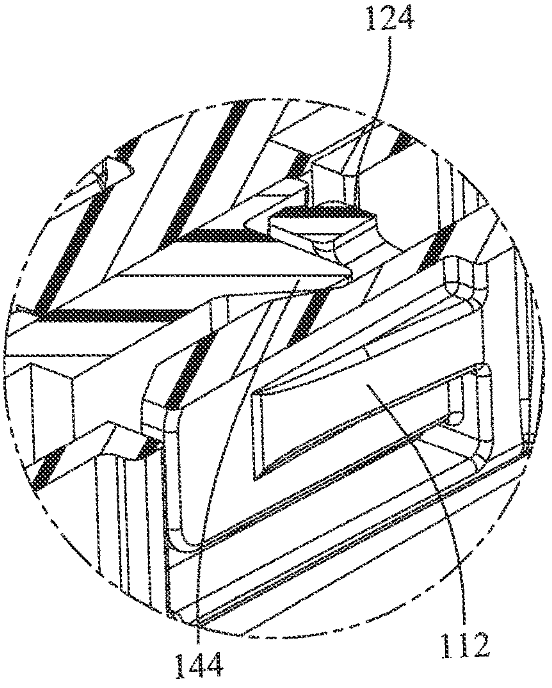

The male terminal stabilizer 102 also defines four flexible retraction arms 146, each having a hook feature 148 on its distal end shown in FIG. 8 that engages four solid corresponding retraction faces 150 defined by the second connector body 138 when the first connector body 106 is unmated from the second connector body 138 as shown in FIGS. 19A and 19B. The engagement of the hook features 148 with the corresponding retraction faces 150 pulls the male terminal stabilizer 102 from the full staged position 120 to the pre-staged position 118 when the female connector 136 is withdrawn from the male connector 104.

The hook features 148 have angled faces 152 that cause the retraction arms 146 to flex outwardly as they contact the portion of the second connector body 138 defining the retraction faces 150. After the angled faces 152 clear the retraction faces 150, the retention arms 126 flex inwardly and flat faces 154 of the hook features 148 engage the retraction faces 150. The retraction faces 150 are arranged at an acute angle relative to the flat faces 154 of the hook features 148.

When the male connector 104 is unmated from the female connector 136, the retraction arms 146 and the retraction faces 150 exert a retraction force on the male terminal stabilizer 102 and the retention arms 126 and retention stop faces 130 exerts a retention force on the male terminal stabilizer 102. The retraction arms 146 disengage from the retraction faces 150 when the retention force exceeds the retraction force due to the angled retraction faces 150 while the retention arms 126 remain engaged with the retention stop faces 130, thereby allowing the second connector body 138 to be removed from the first connector body 106 while retaining the male terminal stabilizer 102 in the first connector body 106.

As the retention arms 126 engage the retention stop faces 130, the pre-stage stop faces 114 of the pre-stage locking arms 112 reengage the pre-stage stop tabs 124 on the male terminal stabilizer 102 to once again inhibit movement of the male terminal stabilizer 102 from the pre-staged position 118 to the full staged position 120.

In alternative embodiments, the faces on the hook features that engage the retraction faces may be angled while the retraction faces are flat to allow the second connector body to be removed from the first connector body while retaining the male terminal stabilizer in the first connector body.

The female connector 136 also includes a connector position assurance device 156 shown in FIG. 2 that helps to assure that the male and female connectors 104, 136 remain connected. The connector position assurance device 156 can only be activated when the male and female connectors 104, 136 are fully and properly mated. The male and female connectors 104, 136 also include terminal locking devices 158 shown in FIGS. 2 and 3 that are configured to ensure that the terminals 110, 142 remain secured within the corresponding terminal cavities 108, 140. The male and female connectors 104, 136 may also include wire dress covers 160 shown in FIGS. 3 and 6 that help wires extending from the terminals 110, 142 to be routed in the desired direction.

The male terminal stabilizer 102 described herein has been found to be capable of providing a blocking force in excess of 100 newtons to avoid the male terminal stabilizer 102 from being prematurely released from the pre-staged position 118 by an unknown object overcoming the blocking force during shipping and handling prior to the male connector 104 being mated with the female electrical connector.

Figure 23:
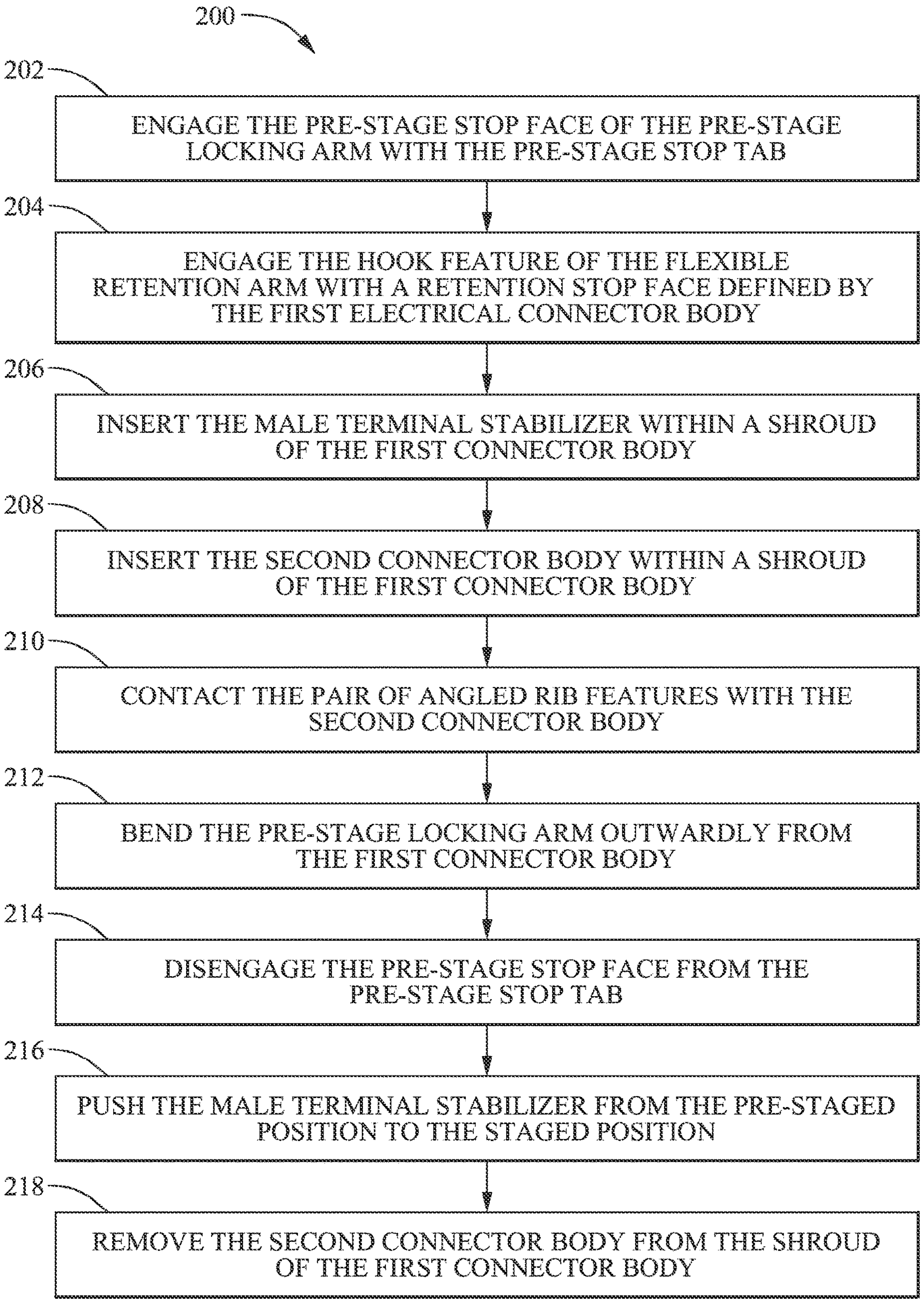
FIG. 23 is a flow chart of a process of connecting and disconnecting an electrical connector assembly according to some embodiments.
Figure 23:
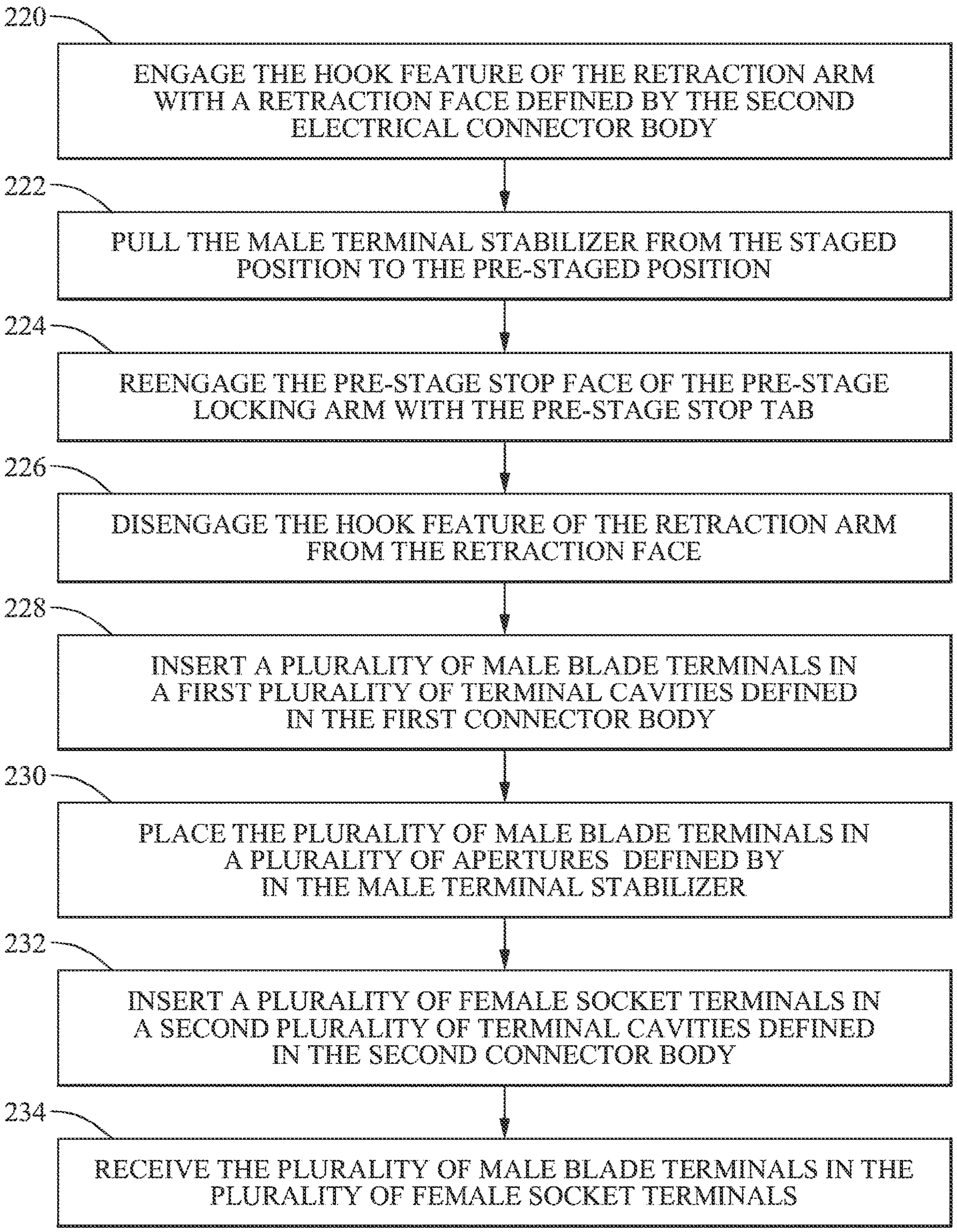

A method 200 of connecting and disconnecting an electrical connector assembly 100 having a first connector including a first connector body 106 including a flexible pre-stage locking arm 112 defining a pre-stage stop face 114 and a pair of angled rib features 116 flanking the pre-stage stop face 114 and a male terminal stabilizer 102 disposed within the first connector body 106 that is movable from a pre-staged position 118 to a full staged position 120 and defines a pre-stage stop tab 124 and a flexible retention arm 126 having a hook feature 128 on its distal end. The electrical connector further including a second connector body 138 is illustrated in FIG. 23. The method may include the steps of:

- STEP 202, ENGAGE THE PRE-STAGE STOP FACE OF THE PRE-STAGE LOCKING ARM WITH THE PRE-STAGE STOP TAB, includes engaging the pre-stage stop face 114 of the pre-stage locking arm 112 with the pre-stage stop tab 124 to inhibit movement of the male terminal stabilizer 102 from the pre-staged position 118 to the full staged position 120;
- STEP 204, ENGAGE THE HOOK FEATURE OF THE FLEXIBLE RETENTION ARM WITH A RETENTION STOP FACE DEFINED BY THE FIRST ELECTRICAL CONNECTOR BODY, includes engaging the hook feature 128 of the flexible retention arm 126 with a retention stop face 130 defined by the first electrical connector body to secure the male terminal stabilizer 102 within the first connector body 106;
- STEP 206, INSERT THE MALE TERMINAL STABILIZER WITHIN A SHROUD OF THE FIRST CONNECTOR BODY, includes inserting the male terminal stabilizer 102 within a shroud of the first connector body 106. STEP 206 preferably occurs before STEPS 202 and 204;
- STEP 208, INSERT THE SECOND CONNECTOR BODY WITHIN A SHROUD OF THE FIRST CONNECTOR BODY, includes inserting the second connector body 138 within a shroud of the first connector body 106;
- STEP 210, CONTACT THE PAIR OF ANGLED RIB FEATURES WITH THE SECOND CONNECTOR BODY, includes contacting the pair of angled rib features 116 with the second connector body 138;
- STEP 212, BEND THE PRE-STAGE LOCKING ARM OUTWARDLY FROM THE FIRST CONNECTOR BODY, includes bending the pre-stage locking arm 112 outwardly from the first connector body 106;
- STEP 214, DISENGAGE THE PRE-STAGE STOP FACE FROM THE PRE-STAGE STOP TAB, includes disengaging the pre-stage stop face 114 from the pre-stage stop tab 124 when the first connector body 106 is mated with the second connector body 138;
- STEP 216, PUSH THE MALE TERMINAL STABILIZER FROM THE PRE-STAGED POSITION TO THE FULL STAGED POSITION, includes pushing the male terminal stabilizer 102 from the pre-staged position 118 to the full staged position 120;
- STEP 218, REMOVE THE SECOND CONNECTOR BODY FROM THE SHROUD OF THE FIRST CONNECTOR BODY, includes removing the second connector body 138 from the shroud of the first connector body 106;
- STEP 220, ENGAGE THE HOOK FEATURE OF THE RETRACTION ARM WITH A RETRACTION FACE DEFINED BY THE SECOND ELECTRICAL CON- NECTOR BODY, includes engaging the hook feature 148 of the retraction arm 146 with a retraction face 150 defined by the second connector body 138 when the first connector body 106 is unmated from the second connector body 138;

STEP 222, PULL THE MALE TERMINAL STABILIZER FROM THE FULL STAGED POSITION TO THE PRE-STAGED POSITION, includes pulling the male terminal stabilizer 102 from the full staged position 120 to the pre-staged position 118 via the engagement of the hook feature 148 of the retraction arm 146 with the retraction face. Preferably, STEP 220 occurs prior to STEP 214;

STEP 224, REENGAGE THE PRE-STAGE STOP FACE OF THE PRE-STAGE LOCKING ARM WITH THE PRE-STAGE STOP TAB, includes reengaging the pre-stage stop face 114 of the pre-stage locking arm 112 with the pre-stage stop tab 124 to inhibit movement of the male terminal stabilizer 102 from the pre-staged position 118 to the full staged position 120;

STEP 226, DISENGAGE THE HOOK FEATURE OF THE RETRACTION ARM FROM THE RETRACTION FACE, includes disengaging the hook feature 148 of the retraction arm 146 from the retraction face 150 when the hook feature 128 of the flexible retention arm 126 engages the retention stop face 130. The retraction arm 146 and the retraction face 150 exerts a retraction force on the male terminal stabilizer 102 and the retention arm 126 and retention stop face 130 exerts a retention force on the male terminal stabilizer 102 as the first connector body 106 is unmated from the second connector body 138. The retraction arm 146 disengages from the retraction face 150 when the retention force exceeds the retraction force.

STEP 228, INSERT A PLURALITY OF MALE TERMINALS IN A FIRST PLURALITY OF TERMINAL CAVITIES DEFINED IN THE FIRST CONNECTOR BODY, includes inserting a plurality of male terminals 110 in a first plurality of terminal cavities 108 defined in the first connector body 106;

STEP 230, PLACE THE PLURALITY OF MALE TERMINALS IN A PLURALITY OF APERTURES DEFINED BY IN THE MALE TERMINAL STABILIZER, includes placing the plurality of male terminals 110 in a plurality of apertures 122 defined by in the male terminal stabilizer 102. The male terminal stabilizer 102 is positioned near distal tips of the plurality of male terminals 110 when in the pre-staged position 118 and is positioned near bases of the plurality of male terminals 110 when in the full staged position 120;

STEP 232, INSERT A PLURALITY OF FEMALE SOCKET TERMINALS DISPOSED IN A SECOND PLURALITY OF TERMINAL CAVITIES DEFINED IN THE SECOND CONNECTOR BODY, includes inserting a plurality of female socket terminals 142 disposed in a second plurality of terminal cavities 140 defined in the second connector body 138. Preferably STEP 232 occurs prior to STEP 208; and STEP 234, RECEIVE THE PLURALITY OF MALE TERMINALS IN THE PLURALITY OF FEMALE SOCKET TERMINALS, includes receiving the plurality of male terminals 110 in the plurality of female socket terminals 142 during 208.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

The invention claimed is:

1. An electrical connector assembly, comprising:

a first connector body including a flexible pre-stage locking arm defining a pre-stage stop face;

a male terminal stabilizer disposed within the first connector body that is moveable from a pre-staged position to a full staged position and defines a pre-stage stop tab and a flexible retention arm, wherein the pre-stage stop face of the pre-stage locking arm is configured to engage the pre-stage stop tab to inhibit movement of the male terminal stabilizer from the pre-staged position to the full staged position and wherein the flexible retention arm is configured to engage a retention stop face defined by the first electrical connector body; and a second connector body configured to contact the flexible pre-stage locking arm and disengage the pre-stage stop face from the pre-stage stop tab when the first connector body is mated with the second connector body, thereby allowing the second connector body to push the male terminal stabilizer from the pre-staged position to the full staged position, wherein the male terminal stabilizer defines a flexible retraction arm configured to engage a retraction face defined by the second electrical connector body when the first connector body is unmated from the second connector body, thereby pulling the male terminal stabilizer from the full staged position to the pre-staged position.

2. The electrical connector assembly according to claim 1, wherein the flexible retraction arm and the retraction face exerts a retraction force on the male terminal stabilizer and the retention arm and retention stop face exerts a retention force on the male terminal stabilizer as the first connector body is unmated from the second connector body and wherein the flexible retraction arm disengages from the retraction face when the retention force exceeds the retraction force.

3. The electrical connector assembly according to claim 1, wherein the retraction face contacts the flexible retraction arm prior to disengagement of the pre-stage stop face from the pre-stage stop tab when the first connector body is mated with the second connector body.

4. The electrical connector assembly according to claim 1, further comprising a plurality of male terminals disposed in a first plurality of terminal cavities defined in the first connector body, wherein the plurality of male terminals is disposed in a plurality of apertures in the male terminal stabilizer, wherein the male terminal stabilizer is positioned near distal tips of the plurality of male terminals when in the pre-staged position and is positioned near bases of the plurality of male terminals when in the full staged position.

5. The electrical connector assembly according to claim 4, further comprising a plurality of female socket terminals disposed in a second plurality of terminal cavities defined in the second connector body, wherein the plurality of male terminals are received in the plurality of female socket terminals when the first connector body is mated with the second connector body.

6. The electrical connector assembly according to claim 1, wherein the pre-stage stop face is arranged substantially perpendicular to the pre-stage locking arm and wherein the pre-stage stop face is arranged substantially parallel to the pre-stage stop tab when the male terminal stabilizer is in the pre-staged position.

7. The electrical connector assembly according to claim 1, wherein the flexible retraction arm defines a hook feature that is arranged substantially perpendicular to the retention stop face when the male terminal stabilizer is in the pre-staged position or in the full staged position.

8. The electrical connector assembly according to claim 1, wherein the flexible retraction arm defines a hook feature on its distal end that engages the retraction face defined by the second electrical connector body, and wherein the retraction face is arranged at an acute angle to the hook feature.

9. The electrical connector assembly according to claim 1, wherein flexible pre-stage locking arm defines an angled rib feature and wherein the second connector body defines a laterally aligned rib feature configured to contact the angled rib feature and disengage the pre-stage stop face from the pre-stage stop tab.

10. A method of connecting and disconnecting an electrical connector assembly having a first connector including a first connector body including a flexible pre-stage locking arm defining a pre-stage stop face and a male terminal stabilizer disposed within the first connector body that is moveable from a pre-staged position to a full staged position and defines a pre-stage stop tab and a flexible retention arm, said electrical connector further including a second connector body, said method comprising:

a) engaging the pre-stage stop face of the pre-stage locking arm with the pre-stage stop tab to inhibit movement of the male terminal stabilizer from the pre-staged position to the full staged position; and b) engaging the flexible retention arm with a retention stop face defined by the first electrical connector body to secure the male terminal stabilizer within the first connector body.

11. The method according to claim 10, further comprising:

c) inserting the male terminal stabilizer within a shroud of the first connector body, wherein step c) occurs prior to steps a) and b).

12. The method according to claim 10, further comprising:

d) inserting the second connector body within a shroud of the first connector body;

e) contacting the pre-stage locking arm with the second connector body;

f) bending the pre-stage locking arm outwardly from the first connector body;

g) disengaging the pre-stage stop face from the pre-stage stop tab when the first connector body is mated with the second connector body; and h) pushing the male terminal stabilizer from the pre-staged position to the full staged position.

13. The method according to claim 12, wherein the male terminal stabilizer defines a flexible retraction arm, the method further comprising:

i) removing the second connector body from the shroud of the first connector body;

j) engaging the flexible retraction arm with a retraction face defined by the second electrical connector body when the first connector body is unmated from the second connector body; and k) pulling the male terminal stabilizer from the full staged position to the pre-staged position via the engagement of the flexible retraction arm with the retraction face.

14. The method according to claim 13, wherein step j) occurs prior to step g).

15. The method according to claim 13, further comprising:

l) Reengaging the pre-stage stop face of the pre-stage locking arm with the pre-stage stop tab to inhibit movement of the male terminal stabilizer from the pre-staged position to the full staged position.

16. The method according to claim 15, further comprising:

m) disengaging the flexible retraction arm from the retraction face when the flexible retention arm engages the retention stop face.

17. The method according to claim 16, wherein the flexible retraction arm and the retraction face exerts a retraction force on the male terminal stabilizer and the retention arm and retention stop face exerts a retention force on the male terminal stabilizer as the first connector body is unmated from the second connector body and wherein the flexible retraction arm disengages from the retraction face when the retention force exceeds the retraction force.

18. The method according to claim 12, further comprising:

n) inserting a plurality of male terminals in a first plurality of terminal cavities defined in the first connector body; and o) placing the plurality of male terminals in a plurality of apertures defined by in the male terminal stabilizer, wherein the male terminal stabilizer is positioned near distal tips of the plurality of male terminals when in the pre-staged position and is positioned near bases of the plurality of male terminals when in the full staged position.

19. The method according to claim 18, further comprising:

p) inserting a plurality of female socket terminals disposed in a second plurality of terminal cavities defined in the second connector body, wherein step p) occurs prior to step d); and q) receiving the plurality of male terminals in the plurality of female socket terminals during step d).

20. An electrical connector assembly, comprising:

a first connector body;

a male terminal stabilizer disposed within the first connector body that is moveable from a pre-staged position to a full staged position;

a second connector body;

means for retaining the male terminal stabilizer in the pre-staged position until the second connector body is inserted within the first connector body;

means for releasing the male terminal stabilizer from the pre-stage position and allowing the second connector body to push the male terminal stabilizer to the full staged position;

means for returning the male terminal stabilizer from the full staged position to the pre-staged when the second connector body is withdrawn from the first connector body; and means for retaining the male terminal stabilizer in the first connector body as the second connector body is withdrawn from the first connector body.

* * * * *